May 17, 1960   A. V. LEVENSTEINS ET AL   2,936,739
FLUID POWER STEERING

Filed March 16, 1956   2 Sheets-Sheet 2

INVENTORS
Aleksandrs Voldemars Levensteins,
BY William Blair Thompson

S. C. Thorpe
ATTORNEY

# United States Patent Office 2,936,739
Patented May 17, 1960

2,936,739

FLUID POWER STEERING

Aleksandrs Voldemars Levensteins and William Blair Thompson, Saginaw, Mich., assignors to General Motors Corporation, Detroit, Mich., a corporation of Delaware Application March 16, 1956, Serial No. 571,924

3 Claims. (Cl. 121—41)

This invention relates to a fluid power steering unit of novel construction and operation. According to the popular classification, the unit would be referred to as an "integral" power steering gear, i.e. the power mechanism is in effect built into the gear box.

Such a power steering unit is advantageous for a number of reasons. Thus, it is generally felt that with the fluid motor or power cylinder carried upward out of association with the steering linkage where it might suffer damage as from stones, etc., a safer device results. Another and perhaps more important benefit derives from the greater convenience at assembly, that is when the power steering apparatus is installed as original equipment on the vehicle as is generally the case.

Despite the indicated and other advantages, integral gears heretofore proposed have been objected to as too bulky, this in view of the very limited space available in the engine compartment of the modern automobile, a condition deriving from present day ideas of body design compounded by the growing number of accessories involving components necessarily or advantageously carried within the engine compartment.

The principal object of the invention is, therefore, to provide an integral power steering gear which occupies substantially no more space than an ordinary mechanical gear. Another object is to provide such a power steering gear at low cost and without sacrifice in operating efficiency.

Figure 1:
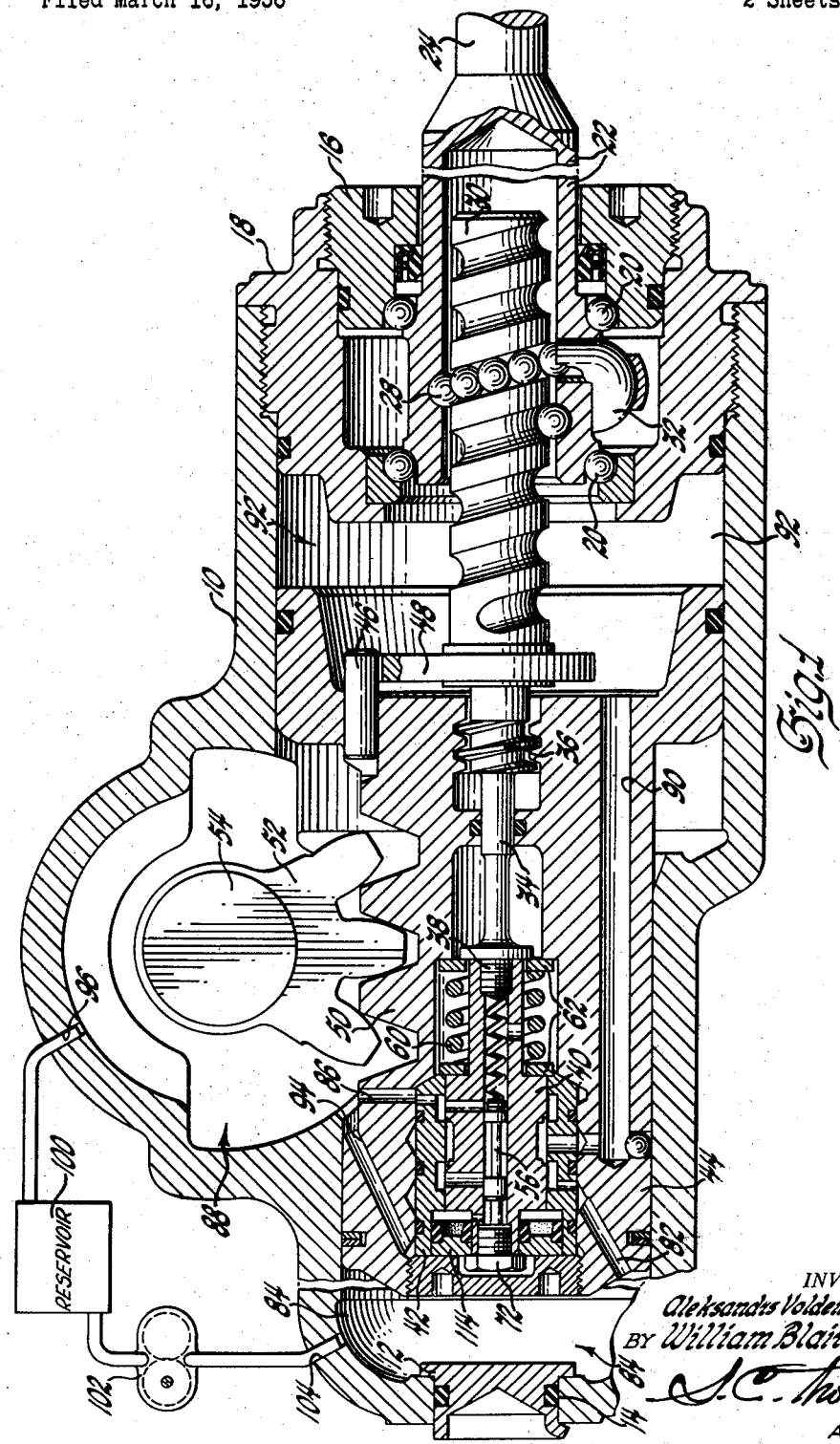
Figure 2:
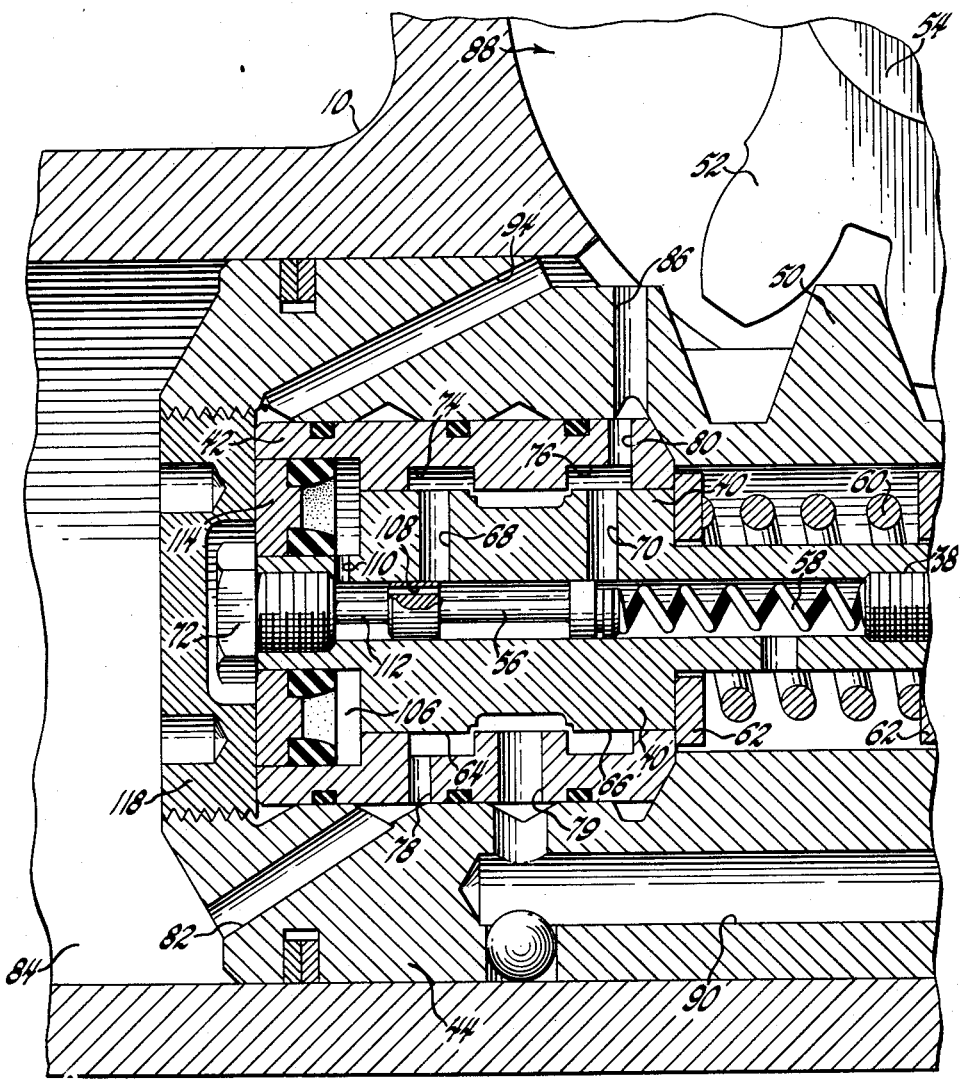

This invention will be described in terms of a preferred embodiment thereof illustrated by the accompanying drawing wherein Figure 1 shows the unit in longitudinal section, with auxiliary equipment represented in a diagrammatic fashion, and Figure 2 is an enlarged fragmentary section.

In the drawing, the numeral 10 indicates a gear box or housing which, on installation of the unit, is suitably fixed to the vehicle frame. The housing is closed at its lower or left-hand end by a plug 12, annularly grooved to accommodate a seal 14, and at its other end by a threaded adjustor assembly 16, which with an adaptor 18, also threaded into the housing, encircles a ball bearing 20 for a member 22 at the end of the steering shaft 24. Such member is held against longitudinal movement by the bearing and is internally grooved to seat balls 28 providing the connection between it and a worm 30 partially confined therewithin. Member 22 may, if desired, be connected to the steering shaft 24 through a flexible coupling, not shown, answering to any alignment problems. A U-shaped tube 32 provides a return channel for the balls 28 which represent a continuous train. The length of the internal groove in the member 22 corresponds to the helical distance between the ends of the tube 32.

Worm 30 inwardly of the housing 10 carries an integral stem portion 34 provided with acme threads at 36 and terminating in a threaded stud 38. Just rearward of the stud 34 is flanged to abut the right-hand end of the spool component 40 of a control valve, which additionally comprises a sleeve 42, confined with the spool within the piston 44. The latter carries a pin 46 received between the arms of a yoke 48 whereby the worm 30 is prevented from rotating in operation of the gear.

Piston 44 will be observed as provided with rack teeth 50 mating with a gear sector 52 integral with a cross shaft 54. This shaft is journalled in the housing 10 and extends outward thereof, as for connection to a conventional pitman arm through which the steering linkage, which may be of any suitable type, is actuated.

Reverting to the control valve, there will be seen confined within the spool 40 a double-land plunger 56 (Fig. 2) biased in a leftward direction by a spring 58 abutting the end of the threaded stud 38. The purpose of these parts will be later explained.

A spring 60 between washer seats 62 serves to maintain the spool 40 in its normal position as shown. The spool comprises a pair of lands 64, 66, these lands being drilled to provide passageways 68 and 70 in communication with the bore in which the plunger 56 is housed. This bore, incidentally, will be noted as closed at its left-hand end by a threaded plug 72.

Sleeve 42, surrounding the body of the spool 40, is internally bored and counterbored to provide annular channels 74 and 76 and passageways 78, 79, and 80. Passageway 78 communicates with a passageway 82 formed in the piston 44 and extending to the chamber 84, while passageway 80 connects with a passageway 86 in the piston opening to the chamber 88 in which the gear sector 52 is confined.

In addition to the passageways 82 and 86, piston 44 includes a passageway 90 communicating with the passageway 79 in the sleeve 42 and opening to the chamber 92 at the right of the piston (Fig. 1). A passageway 94 shown at the upper left-hand portion of the piston as represented in the drawing is merely a bleed to exhaust.

In the upper rounded portion of the housing 10 is a port 96 connecting with a reservoir 100 from which a pump 102 supplying the pressure for the system draws. Pump 102 may be powered as through the crankshaft of the engine of the vehicle and discharges to the power steering unit through a port 104 located in the housing 10 leftward of the piston 44.

Reverting still again to the control valve, mention should be made of the chamber 106 at the left of the spool 40. This is a so-called "feel" chamber which is supplied with pressure fluid via the passageways 82 and 78, annular channel 74, and passageway 68. Fluid entering the bore of the spool 40 from the passageway 68 reaches the chamber through a drilled hole 108 in the left-hand land of the plunger 56 and the passageway 110 in the left-hand boss portion of the spool 40. The previously mentioned threaded plug 72, which has a stem extension 112 abutting the left-hand land of the plunger 56 with the parts in their positions shown, backs up a seal ring 114 so that when the spool 40 is moved rightward the seal ring is carried in the same direction. On leftward movement of the spool 40, however, the boss portion of the spool slides within the seal ring which obviously cannot move leftward due to the closure 118.

Operation

With the valve spool 40 in its neutral or centered position, pressure fluid entering the unit via port 104 flows through the rack piston and valve to exhaust through the port 96. This flow follows the passageways 82 and 78, annular channels 74 and 76, and passageways 80 and 86. Considering passageways 79 and 90, such flow obviously occurs against the static pressure of the fluid confined in the chamber 92.

Assuming a right turn, and assuming further a load on the cross shaft 54 sufficient to preclude steering through the centering spring 60, which may be gauged to withstand a force of say 3–8 pounds imposed at the steering wheel, worm 30 on the clockwise rotation of member 22 moves longitudinally rightwardly to displace the spool 40 in that direction. Accordingly, flow of pressure fluid to the chamber 92 is blocked and a pressure differential is created across the piston 44 in favor of the chamber 84. The piston, consequently, is displaced to the right to rotate the gear sector 52 and the integral cross shaft 54 counterclockwise. During this action the chamber 92 is open to exhaust via passageways 90, 79, 70, 80, and 86.

The displacement of the spool 40 occurs against the pressure of the fluid in the chamber 106, as previously described, hence the operator at the steering wheel is provided with a sense of feel proportionate to the actual steering resistance, since such resistance is proportionately reflected by the pressure required to displace the piston 44.

Now, if the steering resistance is at or near maximum, as is the case during parking operations, for example, it is desirable that the pressure at 106 be relieved to reduce the effort required at the steering wheel. It is to this end that the plunger 56 is provided. Thus, at a pressure with reference to which the spring 58 is gauged, this plunger is shifted rightward and the fluid in the chamber 106 is consequently permitted egress to exhaust via the passageway 110, the drilled hole 108, and passageways 70, 80, and 86.

The limit or relief valve represented by the plunger 56 of itself forms no part of the present invention, being disclosed and claimed in the co-pending application of Ludwig A. Gribler, S.N. 474,969, filed July 12, 1955, now abandoned.

When the steering shaft 24 is turned counterclockwise to negotiate a left turn, the valve spool 40 is displaced correspondingly to more fully open the chamber 92 to the pressure inlet 82 and to prevent flow from such chamber to exhaust. As a consequence, the piston 44 moves leftward to power the left turn. This action occurs despite the pressure at 84 in view of the larger area of the piston 44 available for fluid reaction in the chamber 92 and is marked by fluid flow from chamber 84 to chamber 92.

As in the instance of a right turn, the displacement of the spool 40 on a left turn occurs against the resistance of the fluid in the chamber 106, the reaction surface in this instance being supplied by the spool itself rather than by the seal ring 114. The reaction surface provided by the spool is manifestly less than that provided by the seal ring, this in order to equalize the feel given the operator, a higher pressure under a given steering resistance being necessary to effect a left turn than a right turn.

Having thus described and illustrated our invention what we claim is:

1. Fluid power steering apparatus comprising a cylinder, a rockable member having a portion extending through a wall of said cylinder, said member being toothed, a piston within the cylinder and delineating a pair of opposed chambers therewithin, said piston having rack teeth on the body thereof meshing with the teeth of said rockable member and further having a substantially centrally located bore together with a pair of passages extending from said bore to said opposed chambers and a third passage opening to said cylinder at a point between the ends of the piston, said cylinder being provided with a pressure port opening to one of said chambers and an exhaust port in communication with said third passage, a valve housed within said bore controlling said passages, and manually actuated means extending into said cylinder including a member operably connected to said valve, such member being moved linearly incident to operation of the apparatus.

2. Fluid power steering apparatus comprising a cylinder, a rockable member having a portion extending through a wall of said cylinder, said member being toothed, a piston within the cylinder and delineating a pair of opposed chambers therewithin, said piston having rack teeth on the body thereof meshing with the teeth of said rockable member and further having a substantially centrally located bore together with a pair of passages extending from said bore to said opposed chambers and a third passage opening to said cylinder at a point between the ends of the piston, said cylinder being provided with a pressure port opening to one of said chambers and an exhaust port in communication with said third passage, a valve housed within said bore controlling said passages, said valve including a reaction chamber normally in open communication with said pressure port via one of said passages, and manually actuated means extending into said cylinder, said last means taking the form of a screw moved linearly to actuate said valve and a shaft having a tubular end portion within which said screw is accommodated, said screw and said tubular end portion being operably interconnected via a recirculating endless ball train.

3. Apparatus according to claim 2 where the end of said piston in the chamber to which said pressure port opens presents a lesser area for fluid reaction than the other end of said piston.

References Cited in the file of this patent

UNITED STATES PATENTS

| | | |
|---|---|---|
| 1,234,882 | Doble | July 31, 1917 |
| 1,790,620 | Davis | Jan. 27, 1931 |
| 2,421,726 | Thomas | June 3, 1947 |
| 2,574,335 | Leduc | Nov. 6, 1951 |
| 2,661,726 | Alfieri | Dec. 8, 1953 |
| 2,670,715 | Conway | Mar. 2, 1954 |
| 2,679,234 | Robinson | May 25, 1954 |
| 2,710,596 | Folkerts | June 14, 1955 |
| 2,722,199 | Blanchette et al. | Nov. 1, 1955 |
| 2,824,314 | Davis | Feb. 25, 1958 |